United States Patent [19]

Chen

[11] Patent Number: 4,854,226
[45] Date of Patent: Aug. 8, 1989

[54] CONTINUOUS PROCESSING MACHINES FOR BAKING BUNS

[76] Inventor: Tasi A. Chen, 201 Sec. 3 Ba-Dar Road, Taipei, Taiwan

[21] Appl. No.: 178,984

[22] Filed: Apr. 7, 1988

[51] Int. Cl.⁴ ............................................. A47J 37/00
[52] U.S. Cl. ...................................... 99/353; 99/355; 99/443 C; 99/450.6
[58] Field of Search .................................. 99/353–355, 99/400, 450.6–450.8, 443 C, 426, 432, 373, 345, 428, 349, 423

[56] References Cited

U.S. PATENT DOCUMENTS

| | | | |
|---|---|---|---|
| 1,333,781 | 3/1920 | Shaut | 99/373 |
| 1,777,830 | 10/1930 | Estrin | 99/450.8 X |
| 3,146,730 | 9/1964 | White | 99/353 X |
| 3,724,361 | 4/1973 | Schafer | 99/450.6 |
| 3,906,850 | 9/1975 | Papai | 99/450.7 |
| 4,100,848 | 7/1978 | Grissinger | 99/353 |
| 4,711,166 | 12/1987 | Chen | 99/443 C |

Primary Examiner—Timothy F. Simone
Attorney, Agent, or Firm—Morton J. Rosenberg

[57] ABSTRACT

This invention relates to a continuous processing baking machine, more particularly to a continuous processing machine for baking buns. It includes a conveyer endlessly conveying a plurality of baking molds through a process comprising a feed means for feeding firm paste to form paste covers, a handling means having setting arm for mounting upper molds on the baking molds prior to the feeds of firm paste, a picking arm for lifting the upper mold after the paste covers are baked into crusts within a heating chamber and a conveyer arranged between the setting arm and the picking arm for returning the upper molds for repeated uses, a feed means for feeding fillings into the crusts contained in the baking molds, a supply means for providing the filling crusts with conjugate upper covers to complete the buns which are carried through a bake means to be fully baked, and an extruding means for extruding the baked buns from the containing molds.

9 Claims, 6 Drawing Sheets

CONTINUOUS PROCESSING MACHINES FOR BAKING BUNS

BACKGROUND OF THE INVENTION

This invention relates to a continuous processing baking machine, more particularly to a continuous processing machine for baking buns.

Conventionally, preparatory steps for processing filled buns include kneading material, dividing the firm paste into covers, feeding fillings and shaping those into buns are manually accomplished. Obviously, this is rather a time-consuming task and additionally is not sanitary.

SUMMARY OF THE INVENTION

It is therefore an object of the present invention to provide a continuous processing machine for baking buns to overcome time consuming and non-sanitary conditions associated with manual processing of baking buns.

The continuous processing machine for baking buns of the present invention includes a conveyer endlessly conveying a plurality of baking molds through a process comprising a feed means for feeding firm paste to form paste covers of buns, a handling means having a setting arm for mounting upper molds on the respective baking molds prior to the feeds of firm paste by said feed means to cooperatively provide spaces for forming said paste covers, a picking arm for lifting the upper molds after the paste covers are baked into crusts within a heating chamber and a conveyer arranged between the setting arm and the picking arm for returning the upper molds for repeated uses. A feed means for feeding fillings into the crusts of buns contained in the baking molds, is provided with a supply means for providing the filled crusts with conjugate upper covers to complete the buns which are carried through a bake means to be fully baked. An extruding means extrudes the baked buns from the recesses of the baking molds.

DETAILED DESCRIPTION OF THE PREFERRED EMBODIMENT

Figure 1:
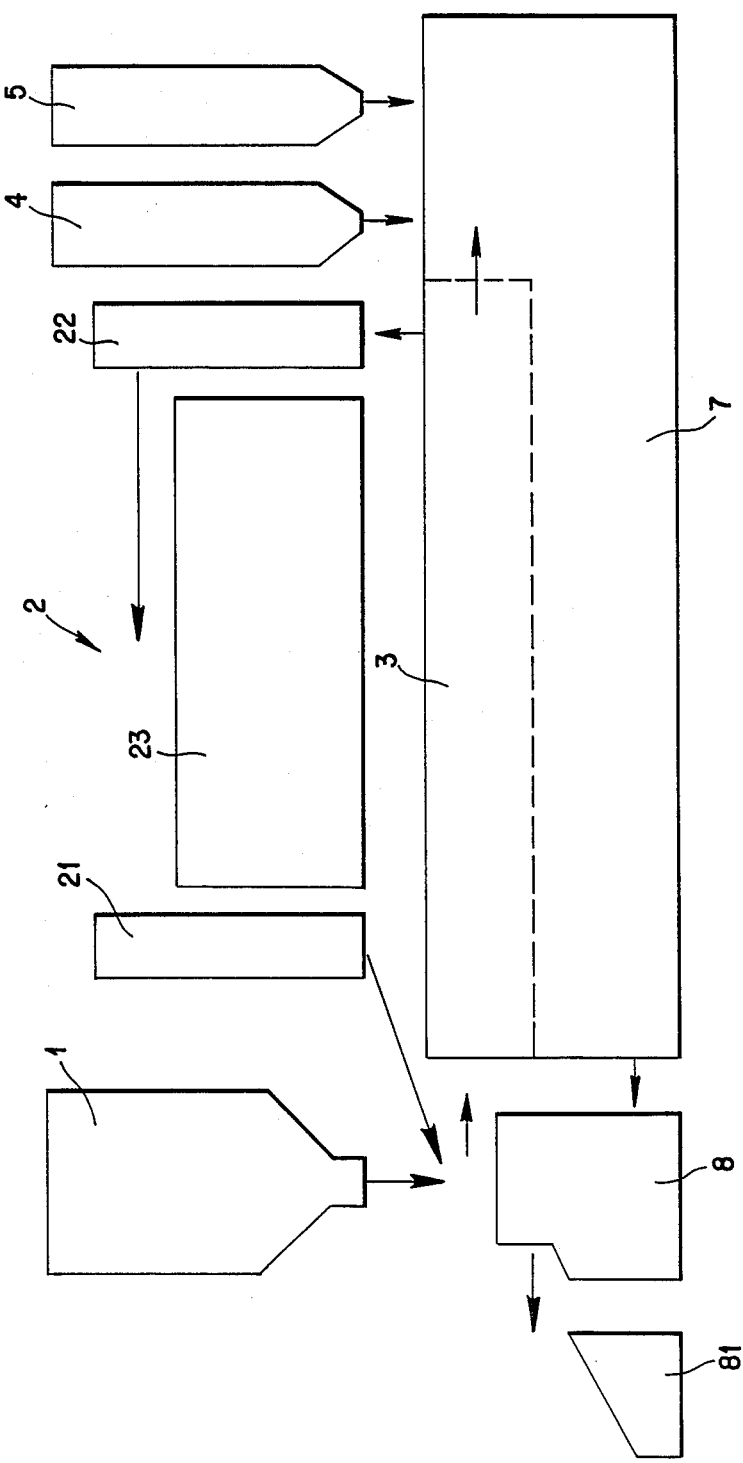
FIG. 1 is a schematic plan view embodying the arrangement of a continuous process of baking buns according to the present invention.

Please refer to FIG. 1, a continuous processing machine for baking buns according to the present invention includes a feed means 1 for feeding firm paste into baking molds to form paste covers of buns, a handling means 2 having a setting arm 21 for repeatedl mounting upper molds on the respective baking molds prior to the feeds of firm paste by said feed means 1, a picking arm 22 for repeatedly lifting said upper molds set by the setting arm 21 and a conveyor 23 for returning the lifted upper molds for next uses, a heating chamber 3 for baking the paste covers into relatively firm crusts, a feed means 4 for feeding fillings into the cursts contained in the baking molds, a supply means 5 for providing the filled crusts with conjugate upper covers to complete the buns, a bake means 7 for fully baking the buns and an extruding means 8 for extruding the baked buns from the baking molds. Said baked buns can be collected by a receiver 81.

Figure 2:
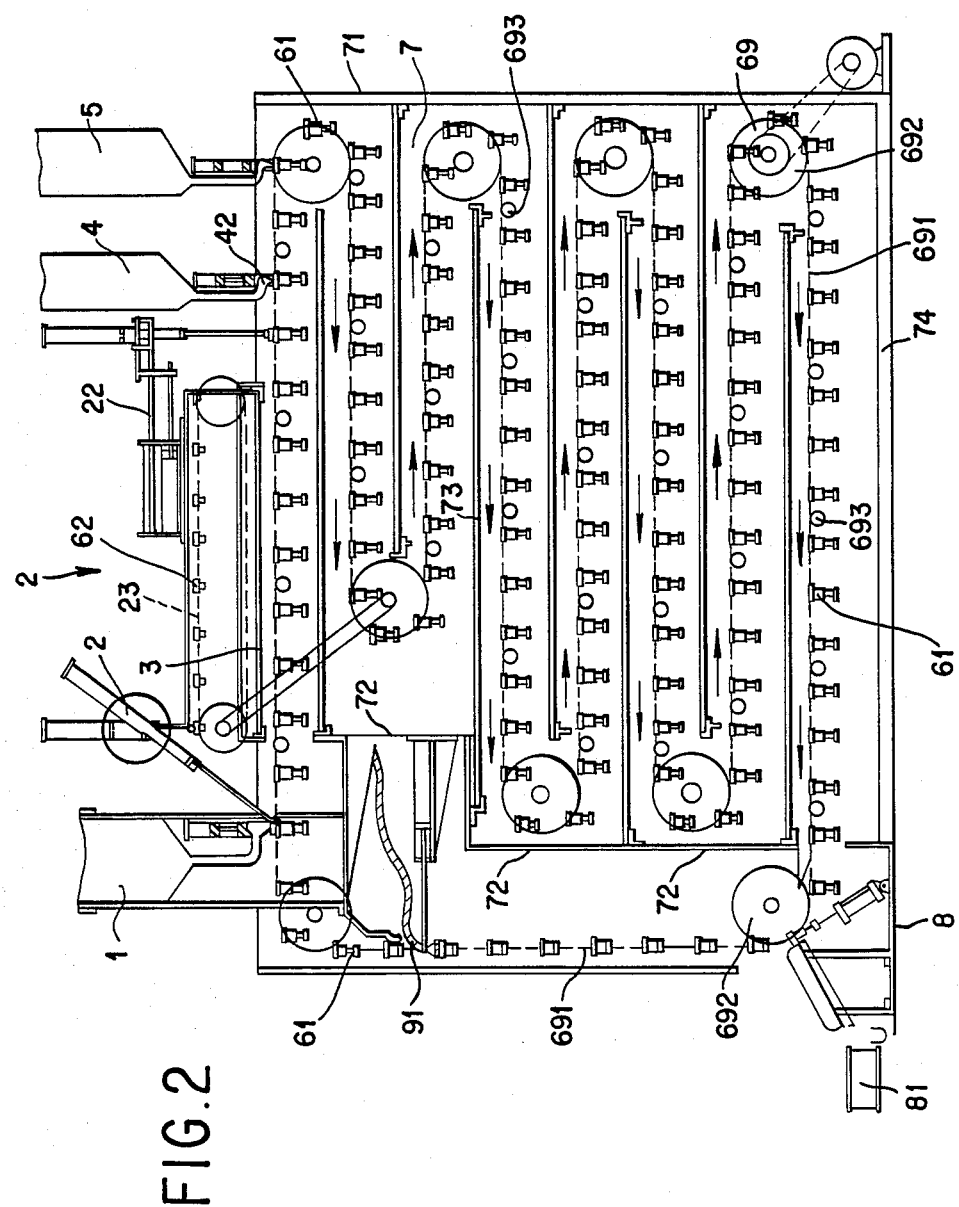
FIG. 2 is an elevation front view of a continuous processing machine for baking buns according to the present invention.

Please refer to FIG. 2, the setting arm 21 of the handling means 2 repeatedly picks up upper molds 62 from a picking position locating on the conveyor 23 near the setting arm 21 and mounts those on the respective baking molds 61. Thereafter, the feed means 1 sequentially feeds rated amounts of firm paste into the baking molds 61 cooperated with the upper molds 62 to form the paste covers of buns that are conveyed one after another through a heating chamber 3 to bake the covers into relatively firm crusts. The cursts are left open after lifting the upper molds 62 from the baking molds 61 by the picking arm 22 in which the lifted upper molds 62 are conveyed back to said picking position for next uses. The crusts contained in the respective baking molds 61 are continuously conveyed along the direction of the marked arrows and to be fed with fillings by the feed means 4 and further provided with conjugate upper covers by the supply means 5 to complete buns which will be conveyed in advance along a bake route staggeringly arranged within a bake means 7 defined by isolating plates 71, 72, 73 and 74 to be fully baked. Thereafter, the baked buns are extruded from the baking molds 61 by an extruding means 8 and packed if necessary. The empty baking molds 61 can be cleaned by a flexible suction conduit 91 to clean out all the residual crumbs, and forwarded for repeated uses.

Figure 3:
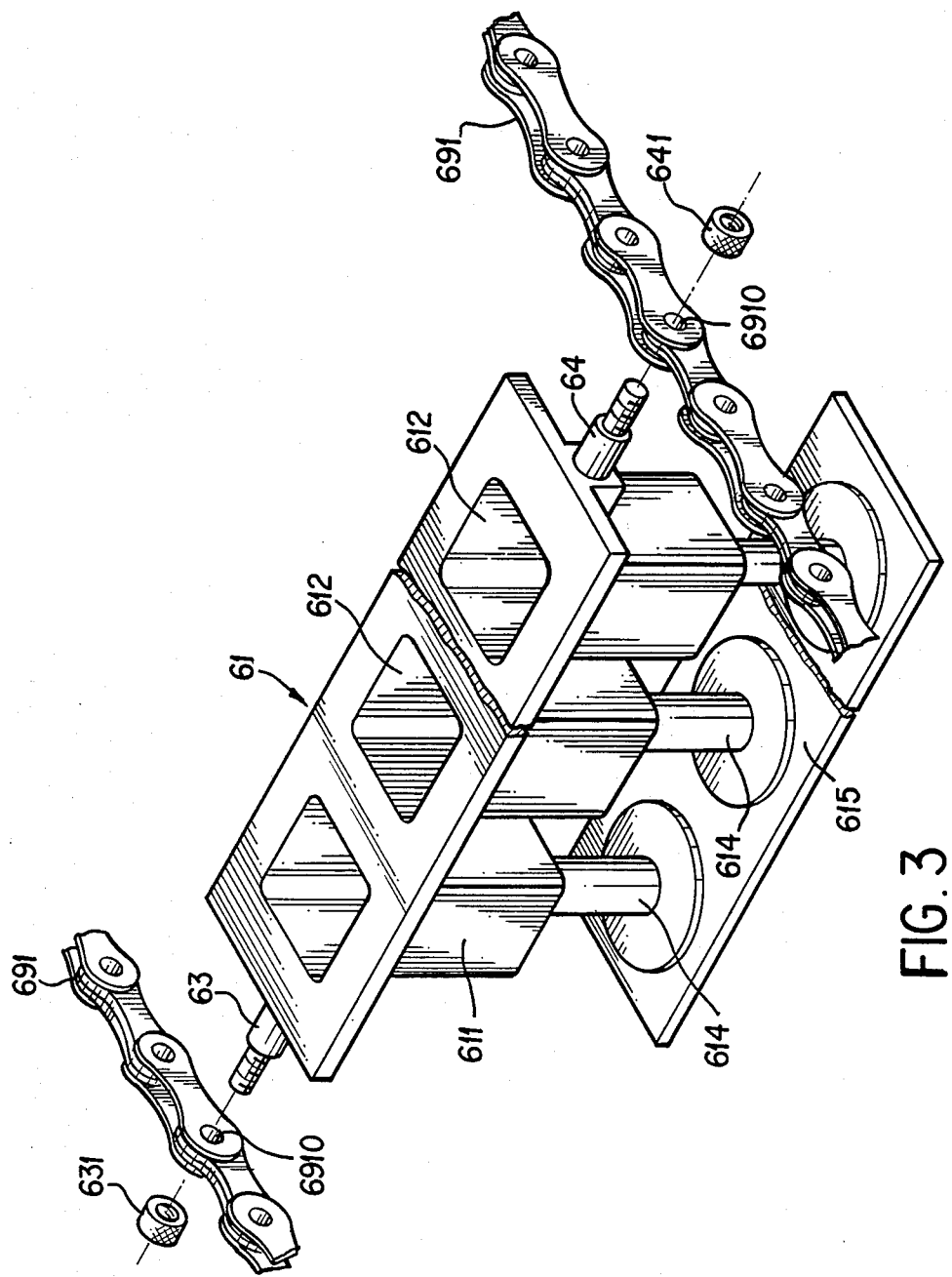
FIG. 3 is a perspective view of a baking mold and related chains used in the present invention.
Figure 4:
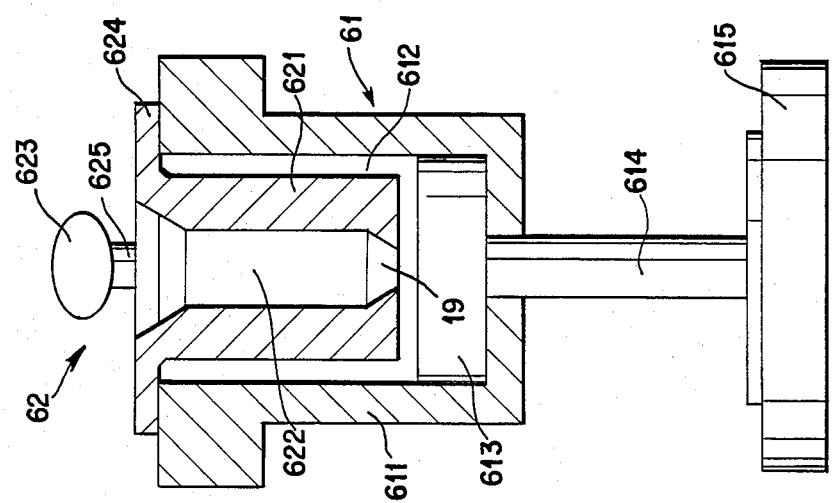
FIG. 4 is a cross-sectional view of a baking mold cooperated with an upper mold used in the present invention.

Please refer to FIGS. 3 and 4, the baking mold 61 includes a mold body 611 having a plurality of aligned recesses 612 with respective pistons 613 movably inserted in the recesses 612, having actuating rods 614 extending downwardly therefrom through the bottom of the mold body 611 with the ends disposed on a common plate 615. Two supporting bars 63, 64 having threaded ends laterally locate on the very upper sides of the mold body 611 that are suitable for fitting in the corresponding bushings 6910 of chains 691 of a conveyer 69 endlessly circulating through the whole process of this inventive machine and fastened with nuts 631, 641. Said recesses 612 can be of different shapes as desired.

An upper mold 62 having a head 623 locating on a cover 624 is suitable for mounting on the baking mold 61 and lifting away, with a plurality of feet 621 (just one foot shown in FIG. 4) respectively extending from the cover 624 downwardly into the recesses 612, having openings 625 formed on the cover 624. There are passages 622 extending from the opening 625 to communicte with the respective spaces formed between the upper mold 62 and the baking mold 61.

Figure 5:
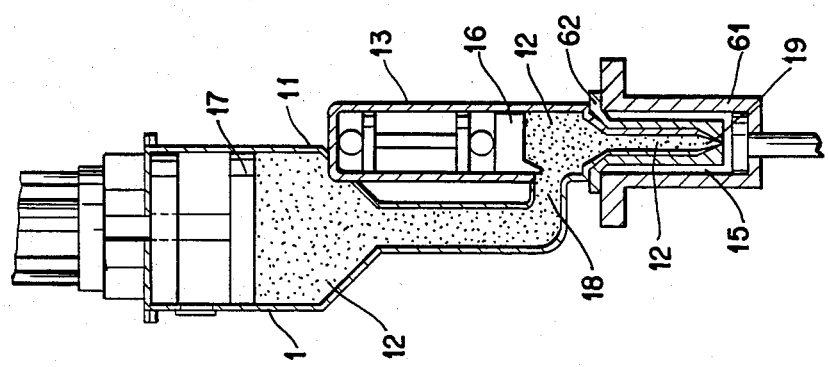
FIG. 5 is a cross-sectional view of a feed means used in the present invention.

Please refer to FIG. 5, the feed means 1 for feeding firm paste into the baking mold 61 cooperated with the upper mold 62 to form paste covers 15 includes a tank 11 containing firm paste 12 and communicating with an introducer 13. Both of the tank 11 and the introducer 13 have respective pistons 17, 16 for pressing the viscous pastes 12 to flow acceleratively. The introducer 13 is such arranged that it will introduce rated amounts of firm paste 12 through an exit 19 locating at the lower end into the respective spaces formed between the baking mold 61 and the upper mold 62 by shutting off the communicating hole 18 along the stroke of the piston 16.

The constructions of the feed means 4 and the supply means 5 are mostly the same as that of the feed means 1 described above.

Figure 6:
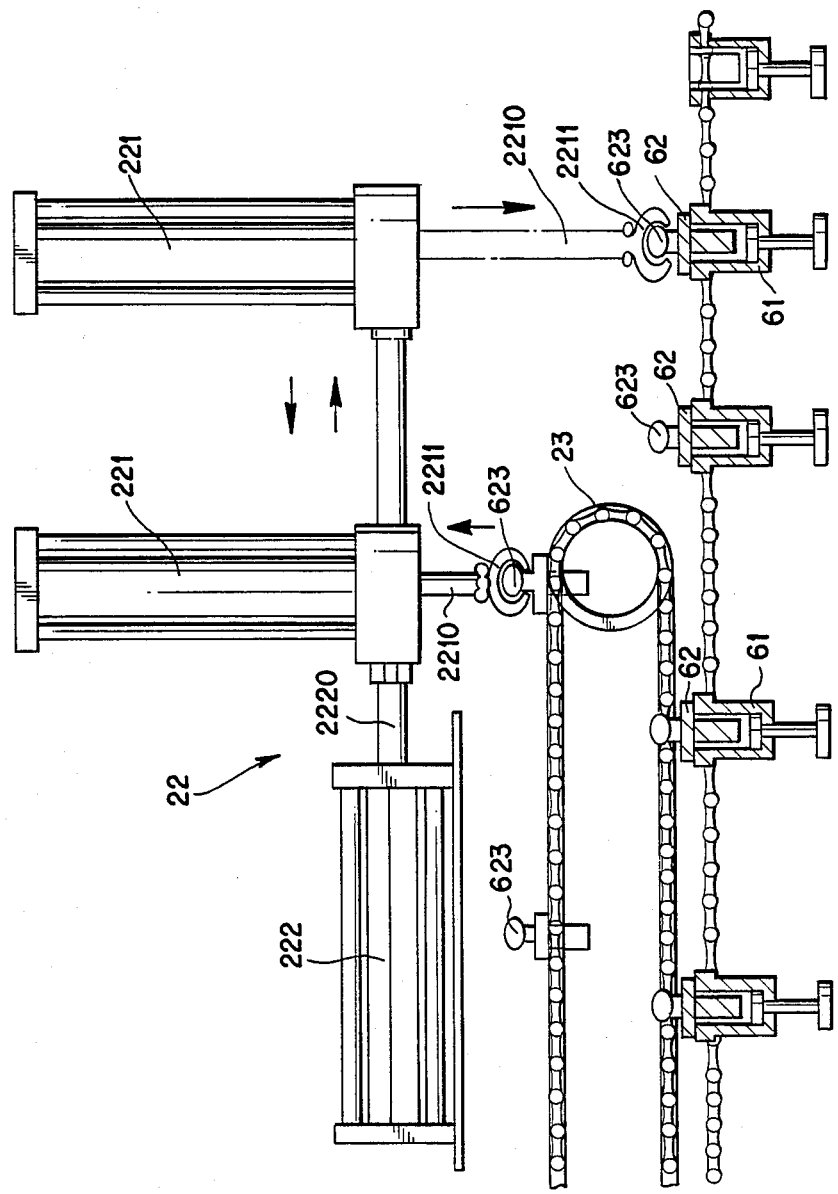
FIG. 6 is a schematic enlarged front view of a picking arm and a conveyor of a handling means and related baking molds, upper molds and chain used in the present invention.

The picking arm 22 of the handling means 2 (as partly shown in FIG. 6) comprises a cylinder 221 having an actuating rod 2210 with a clamp 2211 disposed on the end for up-taking the upper mold 62 away from the baking mold 61, substantially vertically disposed at the end of an actuating rod 2220 of a second cylinder 222 for horizontally shifting the prior cylinder 221 and the clamp 2211 between a position of up-taking the upper molds 62 and a position of setting the upper molds 62 on the conveyor 23 such that the upper molds can be returned to the picking position near said setting arm 21 for next uses.

As shown in FIGS. 1 and 2, setting arm 21 operates in substantially the same manner as picking arm 22 however, in an opposite manner wherein upper molds 62 are removed from conveyor 23 and inserted into baking molds 61 after baking molds 61 have been fed from feeding means 1 shown in FIG. 2 and prior to passage through initial heating chamber 3. Setting arm 21 has substantially the same clamping elements as provided for picking arm 22 previously described and is rotatably mounted to a fixed frame as shown in FIG. 2. The combined upper molds 62 and baking molds 61 then pass under picking arm 22 shown in FIG. 6. The upper molds 62 are then removed as previously described and returned to the conveyor 23.

Figure 7:
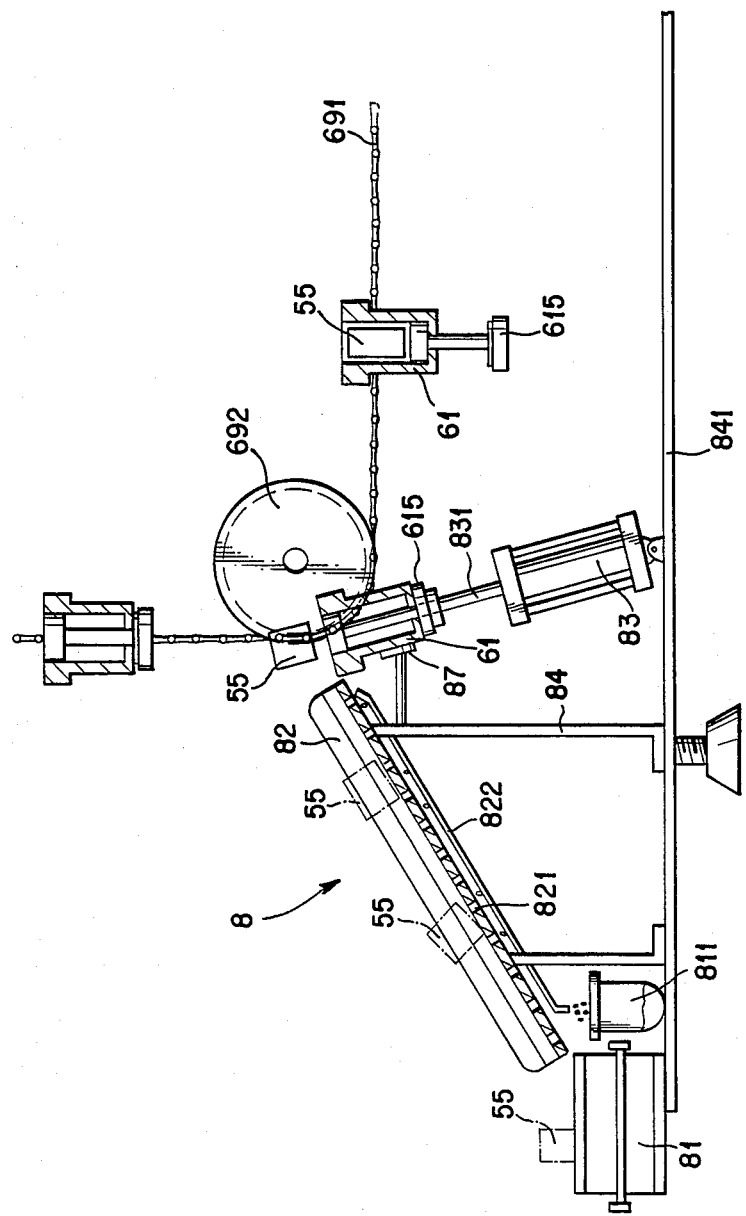
FIG. 7 is a schematic enlarged front view of an extruding means and related baking molds, chain and sprocket wheel used in the present invention.

Please refer to FIG. 7, after the buns 55 are fully baked in the bake means 7, the baking mold 61 containing baked buns 55 is conveyed toward the extruding means 8 which comprises a slider 82 mounted on a frame 84 inclined downwardly and forwardly, with a plurality of recesses 821 formed therein for escaping crumbs departing from the buns 55, and an auxiliary slider 822 mounted correspondingly under the slider 82 for receiving removed crumbs and allowing them to slide into a container 811. A receiver 81 is positioned before the slider 82 for receiving the sliding buns 55. A cylinder 83 is mounted on the floor 841 of the frame 84 behind the slider 82 having an actuating rod 831 which is extendable to push the common plate 615 of the inclining baking mold 61 which are now abutted against a stop 87 disposed on the frame 84 the piston extrudes the buns 55 from the recesses of the baking mold 61 and the extruded buns fall to the slider 82.

The conveyer 69, as shown in FIG. 2, is arranged to circulate endlessly through the whole process of this inventive machine. It comprises a pair of endless chains 691 installed on sprocket wheels 692 properly arranged. It is known by those skilled in the art that a plurality of small adjustable idler sprockets 693 can be properly provided to remove excessive slacks from the chains 691. Through an appropriate power drive, the conveyor 69 continuously conveys a plurality of the baking molds through the process for automatically and continuously baking buns.

It will be appreciated, of course, that although a particular embodiment of the invention has been described, modification may be made. It is intended in the following claims to cover all modifications which fall within the scope of the invention.

What is claimed is:

1. A continuous processing machine for baking buns comprising:
    (a) feed means for feeding firm paste into a plurality of baking molds to form paste covers, said baking molds having recesses formed therein for insert of said firm paste;
    (b) handling means for inserting and removing upper molds from said baking molds prior to and subsequent to said baking molds passing through a heating chamber for heating said paste covers into crusts, said handling means including setting arm means for removing said upper molds from an endless conveyor and inserting said upper molds into said baking molds prior to passage through said heating chamber, and picking arms means for removing said upper molds from said baking molds and positioning said upper molds on said endless conveyor;
    (c) feed means for feeding bun fillings into said crusts of said buns subsequent to passage of said baking molds through said heating chamber;
    (d) supply means located adjacent said feed means for providing said filled crusts of said buns with conjugate upper covers to complete said buns;
    (e) bake means for baking said completed buns, said bake means having baking heaters and isolator plates located therein;
    (f) extruding means located adjacent said bake means for extruding baked buns from said baking molds; and,
    (g) conveyor means for continuously and sequentially displacing said baking molds through said feed means, said heating chamber, said handling means, said feed means, said supply means, said bake means and said extruding means.

2. The continuous processing machine for baking buns as recited in claim 1 where each of said baking molds includes a displaceable piston located within a respective baking mold recess for displacement therein, said piston secured to an actuating rod member on one end thereof, said actuating rod member extending through said baking mold and secured to a plate member on an opposing end.

3. The continuous processing machine for baking buns as recited in claim 2 where each of said baking molds includes a pair of support bar members having threaded first ends for threaded securement to said conveyor means and second ends fixedly coupled to opposing sides of said baking mold.

4. The continuous processing machine for baking buns as recited in claim 3 where each of said upper molds includes a cover member having a head member with an opening formed thereon, and at least one foot member extending internal said bake mold recess.

5. The continuous processing machine for baking buns as recited in claim 1 where said setting arm means of said handling means includes a setting arm member having clamping means located upon an end of an actuating rod member rotatably displaceable on a frame for grasping said upper mold.

6. The continuous processing machine for baking buns as recited in claim 1 where said picking means of said handling means includes a picking arm member having picking clamp means mounted on one end of a picking cylinder actuating rod in vertical alignment with a horizontally displaceable picking cylinder for transferring said upper molds from said conveyor means to said endless conveyor.

7. The continuous processing machine for baking buns as claimed in claim 1 wherein said extruding means includes a cylinder mounted on a floor of a frame member having a displaceable actuating rod coupled to a plate of a foot member to displace a piston for extruding the baked buns from said recess of said baking mold.

8. A continuous processing machine for baking buns as claimed in claim 7 wherein said extruding means further comprises:
   a slider member mounted upon said frame inclined downwardly and forwardly for receiving and collecting said extruded buns.

9. A continuous processing machine for baking buns as claimed in claim 8 wherein said slider member of said extruding means includes a plurality of recesses formed therein for removal of crumbs from said buns and an auxiliary slider member correspondingly locating under said slider member for receiving member and collecting said removed crumbs.

* * * * *